United States Patent
Mazzer

(10) Patent No.: US 7,337,714 B2
(45) Date of Patent: Mar. 4, 2008

(54) APPARATUS FOR PRESSING COFFEE POWDER WITHIN THE FILTER HOLDER

(75) Inventor: Giovanni Mazzer, Gardigiano di Scorze' (IT)

(73) Assignee: Mazzer Luigi S.R.L., Gardigiano di Scorze' (IT)

( * ) Notice: Subject to any disclaimer, the term of this patent is extended or adjusted under 35 U.S.C. 154(b) by 279 days.

(21) Appl. No.: 11/144,664

(22) Filed: Jun. 6, 2005

(65) Prior Publication Data

US 2005/0268789 A1   Dec. 8, 2005

(30) Foreign Application Priority Data

Jun. 4, 2004   (IT) .......................... VE2004A0025

(51) Int. Cl.
*B30B 9/04* (2006.01)
*A47J 31/00* (2006.01)

(52) U.S. Cl. ...................... 100/126; 100/226; 100/265; 100/288; 100/293; 99/287; 99/297

(58) Field of Classification Search ................ 100/110, 100/126, 214, 226, 229 R, 229 A, 265, 266, 100/280, 283, 288, 292, 293; 99/286, 287, 99/349, 297
See application file for complete search history.

(56) References Cited

U.S. PATENT DOCUMENTS

| 2,336,428 | A | * | 12/1943 | Watson | ................... | 68/242 |
| 4,796,521 | A | * | 1/1989 | Grossi | .................. | 99/287 |
| 5,237,911 | A | * | 8/1993 | Aebi | .................. | 99/287 |

* cited by examiner

*Primary Examiner*—Jimmy T. Nguyen
(74) *Attorney, Agent, or Firm*—Hoffman, Wasson & Gitler

(57) ABSTRACT

An apparatus for pressing coffee has a base and housing supporting a filtercup and a pressing cylinder. The pressing cylinder has a forked end engaging a cylindrical body and attached to a rocker arm. A counterweight is attached to an end of the rocker arm. The cylindrical body has a rack engaging a ring gear activated by a lever. Movement of the lever causes movement of the cylindrical body and pressing cylinder. A pinion attached to the cylindrical body moves along a second rack. Movement of the pinion is translated to a bevel gear pair and a pin between the prongs of the forked end.

9 Claims, 3 Drawing Sheets

APPARATUS FOR PRESSING COFFEE POWDER WITHIN THE FILTER HOLDER

BACKGROUND OF THE INVENTION

Coffee powder dispensed by the grinder-dispenser into a filter holder is pressed by the operator by pressing against it a suitable disc rigid with the grinder-dispenser or a manual presser.

This pressing system has however the drawback of not ensuring constant coffee compaction, as it depends on the manual skill of the operator.

Pressing apparatuses provided with dynamometric systems are also known, however these have proved of poor reliability as they are imprecise.

An object of the invention is to eliminate this drawback by providing an apparatus which effects constant pressing of the coffee powder contained in the filter holder.

Another object of the invention is to effect pressing by homogeneously amalgamating the powder contained in the filter holder.

These and other objects which will be apparent from the ensuing description are attained according to the invention by an apparatus for pressing coffee powder in the filter holder.

SUMMARY OF THE INVENTION

An apparatus for pressing coffee has a base and housing supporting a filtercup and a pressing cylinder. The pressing cylinder has a forked end engaging a cylindrical body and attached to a rocker arm. A counterweight is attached to an end of the rocker arm. The cylindrical body has a rack engaging a ring gear activated by a lever. Movement of the lever causes movement of the cylindrical body and pressing cylinder. A pinion attached to the cylindrical body moves along a second rack. Movement of the pinion is translated to a bevel gear pair and a pin between the prongs of the forked end.

BRIEF DESCRIPTION OF THE DRAWINGS

A preferred embodiment of the present invention is described in detail hereinafter by way of non-limiting example with reference to the accompanying drawings, in which.

DETAILED DESCRIPTION OF THE INVENTION

Figure 1:
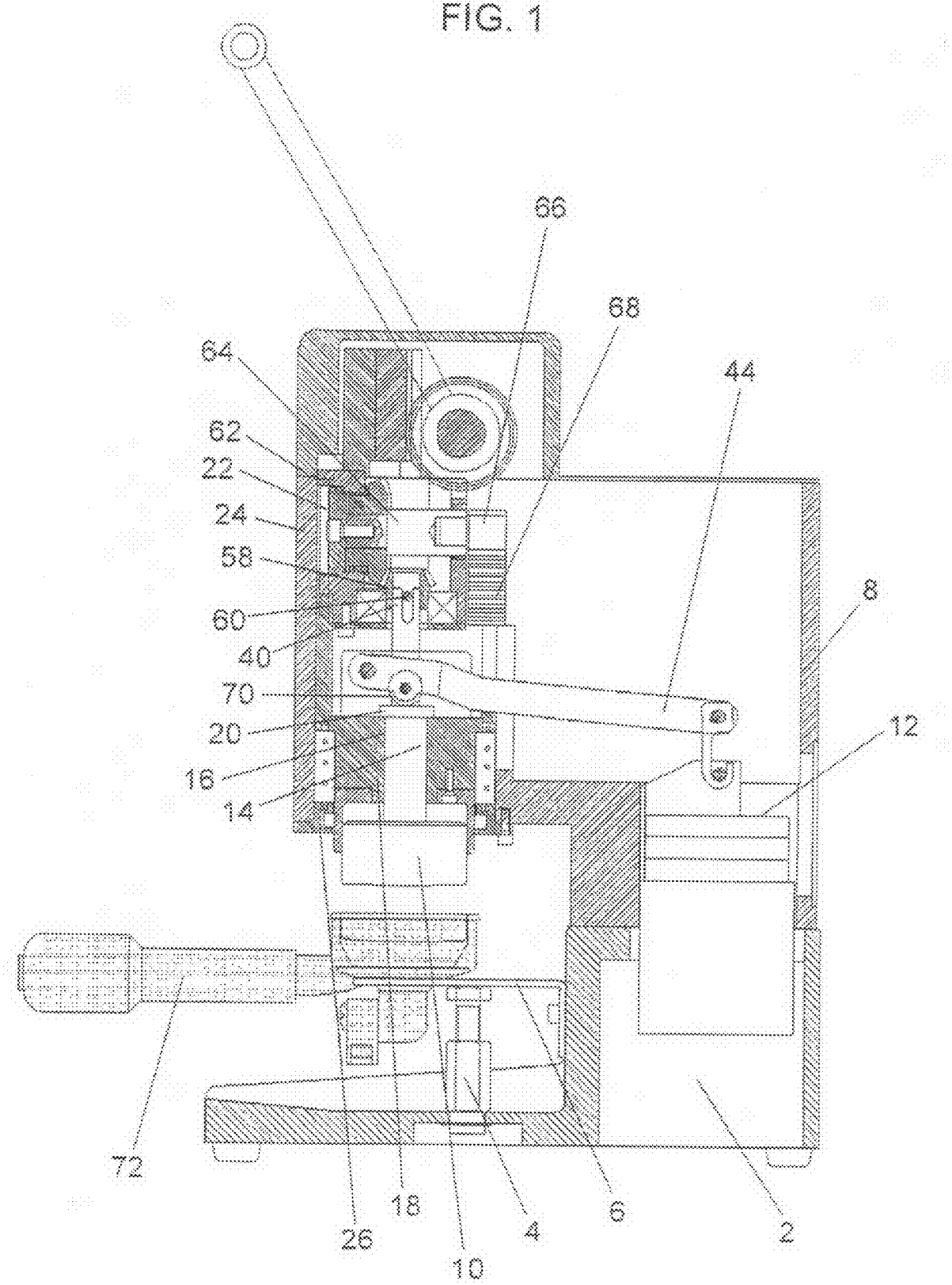
FIG. 1 is a longitudinal section through a pressing machine according to the invention when not in use.
Figure 2:
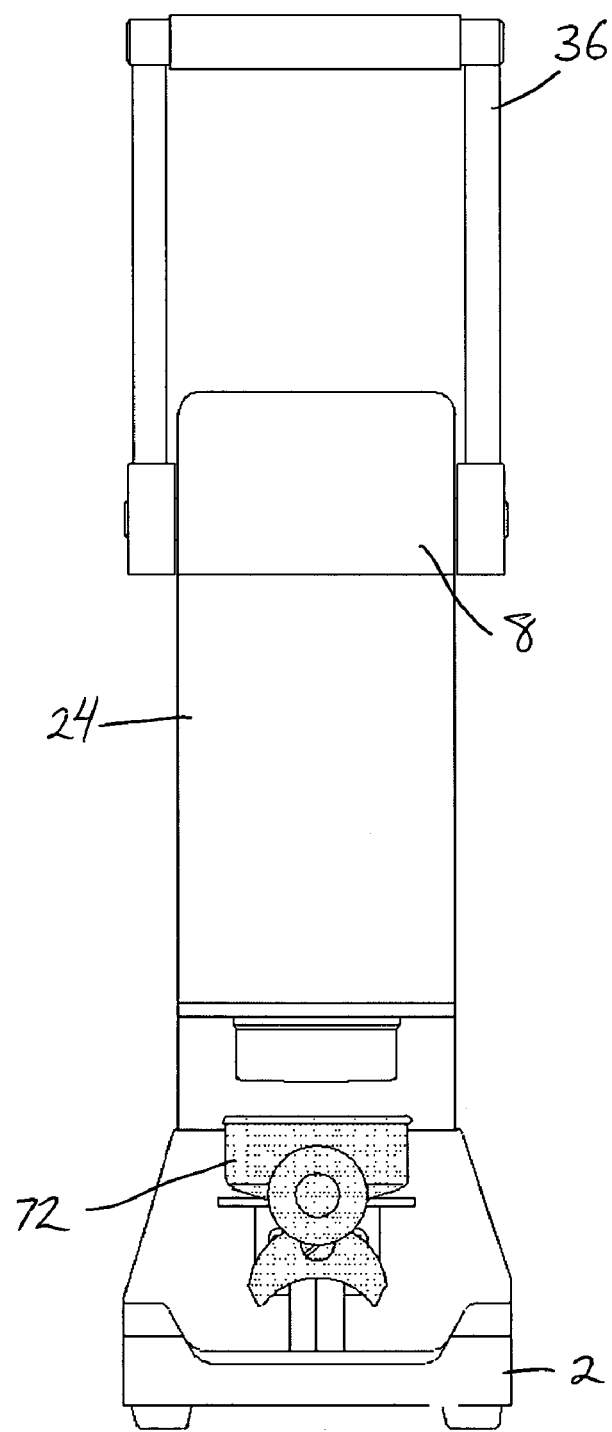
FIG. 2 is a front view thereof.

As can be seen from the figures, the pressing machine of the invention has a cast metal base 2 provided with a threaded pin 4 for a fork 6 of a filter cup 72. On the base 2 rests a housing 8 having a pressing cylinder 10 and a system of counterweights indicated overall by 12.

The pressing cylinder 10 is rigid with a stem 14 inserted into a hole 16 in a bush 18 and having a head 20 of greater dimensions than the hole 16.

The bush 18 is rigid with a cylindrical body 22 slidable within a corresponding sleeve 24 terminating with a closure flange 26 having an annular groove 28 housing a rubber gasket.

The outer surface of the cylindrical body comprises a rack 30 cooperating with a ring gear 32 rigid with a shaft 34 emerging from the housing 8 and secured to a U-shaped lever 36. A spring 38 is disposed coaxial to the pressing cylinder 10 and to the bush 18.

The head 20 extends upwardly into a fork 40 which is inserted into a hole provided in a rocker arm 44 pivoted at 42 to the wall of the cylindrical body 22. The rocker arm traverses an aperture 48 present in the cylindrical body and is provided with a hook 50, for coupling the system of counterweights 12.

The system of counterweights comprises a main weight 52 and a plurality of removable disc-shaped weights 54 which can be rested on the upper surface of the weight 52 through an aperture 56 provided in the rear surface of the housing 8.

The prongs 57 of the fork 40 are inserted into the cavity of a first gearwheel 58 which is provided with a pin 60 housed between the prongs. The first gearwheel 58 engages a second gearwheel 62 to form a bevel gear pair, the second gearwheel 62 being rigid with a shaft 64 provided with a pinion 66 cooperating with the teeth of a rack 68 fixed to the housing 8. Pinion 66 is rotated by the second rack 68. Shaft 64 rotates with the pinion 66. The rotation is passed through the second gear 62 and first gear 58 to consequently rotate fork 40 through pin 60.

Figure 3:
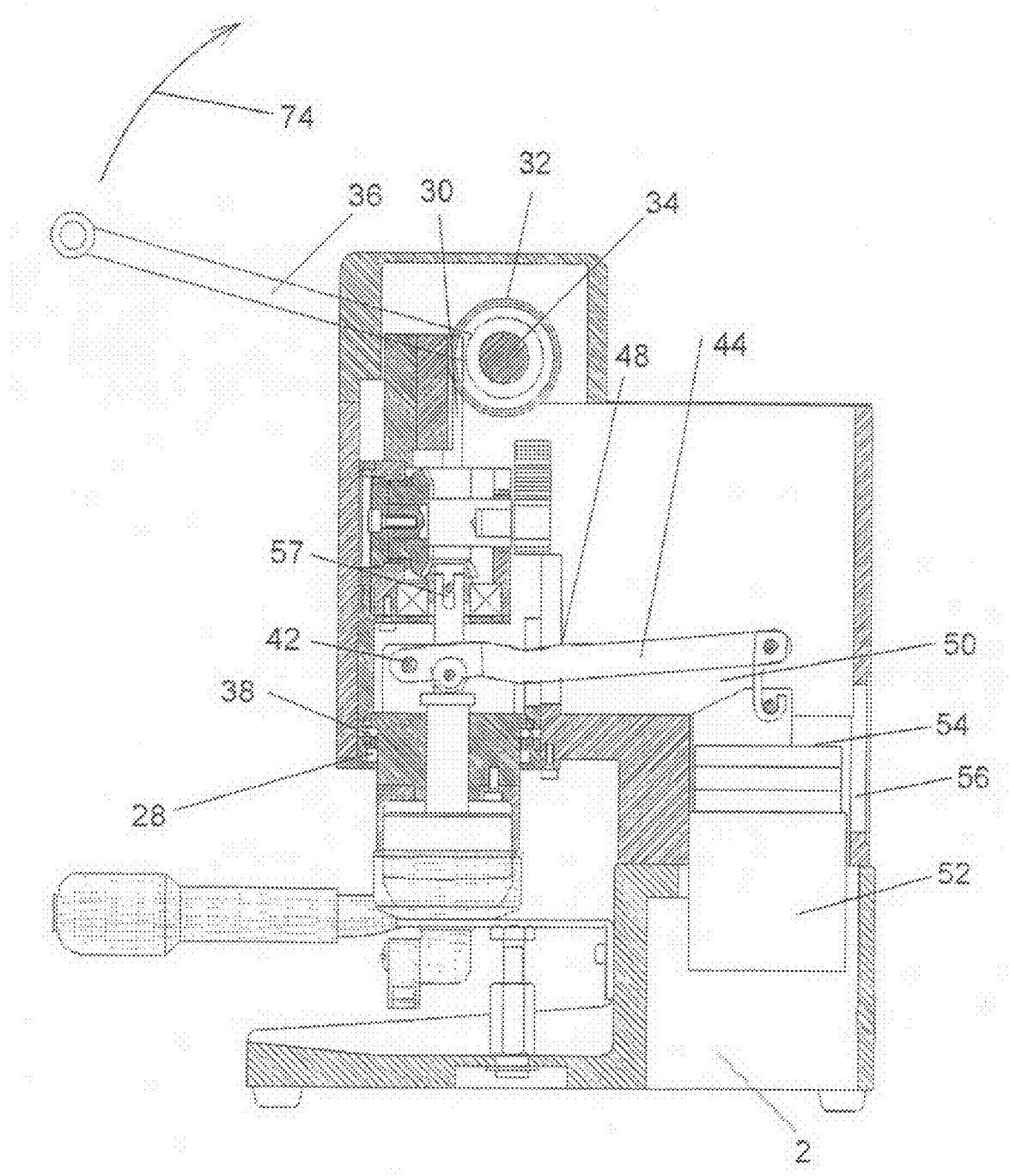
FIG. 3 shows it in the same view as FIG. 1, when in use.

Two bearings 70, secured to the rocker arm 44, interact with the head 20 as shown in FIGS. 1 and 3.

The pressing apparatus operates in the following manner:

When not in use, the system of counterweights disposes the rocker arm 44 in a substantially horizontal configuration, with the cylindrical body 10 assuming the configuration in which it has withdrawn into the housing 8 to its maximum extent as seen FIG. 1.

After positioning the filter cup 72 in the fork 6, the operator operates the lever 36 to rotate the ring gear 32 which, engaged with the rack 30, causes the cylindrical body 22 together with the pressing cylinder 10 supported thereby to descend.

As soon as the pressing cylinder 10 interferes with the coffee contained in the filter holder 72, it partially halts its travel, continuation of the pressing action on the coffee by rotating the lever 36 then causing the bearings 70, to press down on head 20 under the action exerted on the rocker arm 44 by the main weight 52 and by the possible added weights.

The greater the weight acting on the rocker arm, the greater is the force which has to be exerted on the lever, with consequent greater pressing action exerted on the coffee.

At the same time, as the pinion 66 is engaged with the rack 68, the effect of the descent of the body 22 is to rotate the gears of the bevel gear pair and consequently, by virtue of the engagement of the pin 60 between the prongs of the fork 40, to rotate this latter, resulting in movement of the pressing cylinder 10.

When the coffee has been pressed within the cup, the operator rotates the lever in the direction indicated by the arrow 74 to return it to its original configuration.

As a result of this manoeuvre and of the consequent movement of the rack 30, the body 22 also rises aided by the elastic reaction of the previously compressed spring 38 and raises the pressing cylinder 10. The raising of the body 22 causes the rocker arm to rotate so that the weights 52, 54 return to their original configuration.

From the aforegoing it is apparent that the pressing apparatus of the invention effects constant pressing independently of the manual skill of the operator while at the same time homogeneously amalgamating the power within the seat by virtue of rotation of the pressing cylinder 10.

The invention claimed is:

1. An apparatus for pressing coffee powder within a filter holder, comprising:
   a housing,
   a filter cup supporting by said housing,
   a cylindrical body in said housing and vertically overlying said filter cup,
   means for vertically driving said cylindrical body,
   a pressing cylinder having a rod axially slidable within said cylindrical body and having a head connected to an upper portion of said rod,
   a rocker arm having one end pivoting connected to a portion of said cylindrical body and an opposite end connected to a system of counterweights,
   said head of said rod interfering with said rocker arm when said cylindrical body is lowered to bring the pressing cylinder into contact with coffee in said filter cup.

2. An apparatus as claimed in claim 1, wherein the means for driving said cylindrical body consist of a lever rigid with a ring gear cooperating with a rack present on the wall of a cylindrical body.

3. An apparatus as claimed in claim 1, further comprising rotation means for axially rotating the pressing cylinder.

4. An apparatus as claimed in claim 3, wherein the head of the pressing cylinder extends into a fork having prongs, between the prongs of which there engages a pin rigid with the rotation means.

5. An apparatus as claimed in claim 4, wherein the rotation means consist of a bevel gear pair with one of its gearwheels driven by the axial movement of the cylindrical body.

6. An apparatus as claimed in claim 2, wherein the system of counterweights consists of a main weight and a plurality of removable secondary weights.

7. An apparatus for pressing coffee powder within a filter holder, comprising:
   a housing,
   a cylindrical body in said housing, said cylindrical body vertically movable relative to said housing
   a pressing cylinder operatively connected to the cylindrical body, said pressing cylinder having a rod extending from said cylindrical body and a head connected to an upper portion of said rod,
   a rocker arm having one end pivoting connected to a portion of said cylindrical body counterweights connected to an opposing end of the rocker arm,
   said head of said rod interfering with said rocker arm when said cylindrical body is lowered to bring the pressing cylinder into contact with coffee in a filter cup.

8. An apparatus as claimed in claim 7, further comprising
   a first rack on said cylindrical body,
   a ring gear cooperating with the first rack,
   a handle attached to the ring gear, whereby rotation of the handle rotates the ring gear to vertically move the cylindrical body.

9. An apparatus as claimed in claim 7, further comprising
   a fork end having prongs on the pressing cylinder rod,
   a first gear wheel having a cavity, the fork end extending into the cavity, a pin in between the prongs,
   a second gear wheel connected to the cylindrical body and meshing with the first gear wheel, a pinion extending from the second gear wheel,
   a second rack meshing with the pinion,
   whereby downward movement of the cylindrical body causes rotation of the pinion which is transferred through the first and second gear wheels and the pin to the fork end of the rod.

* * * * *